Oct. 28, 1941. O. LORCH 2,260,573
PROCESS FOR THE PRODUCTION OF INDICIA AND LIKE DESIGNS
Filed Sept. 9, 1939
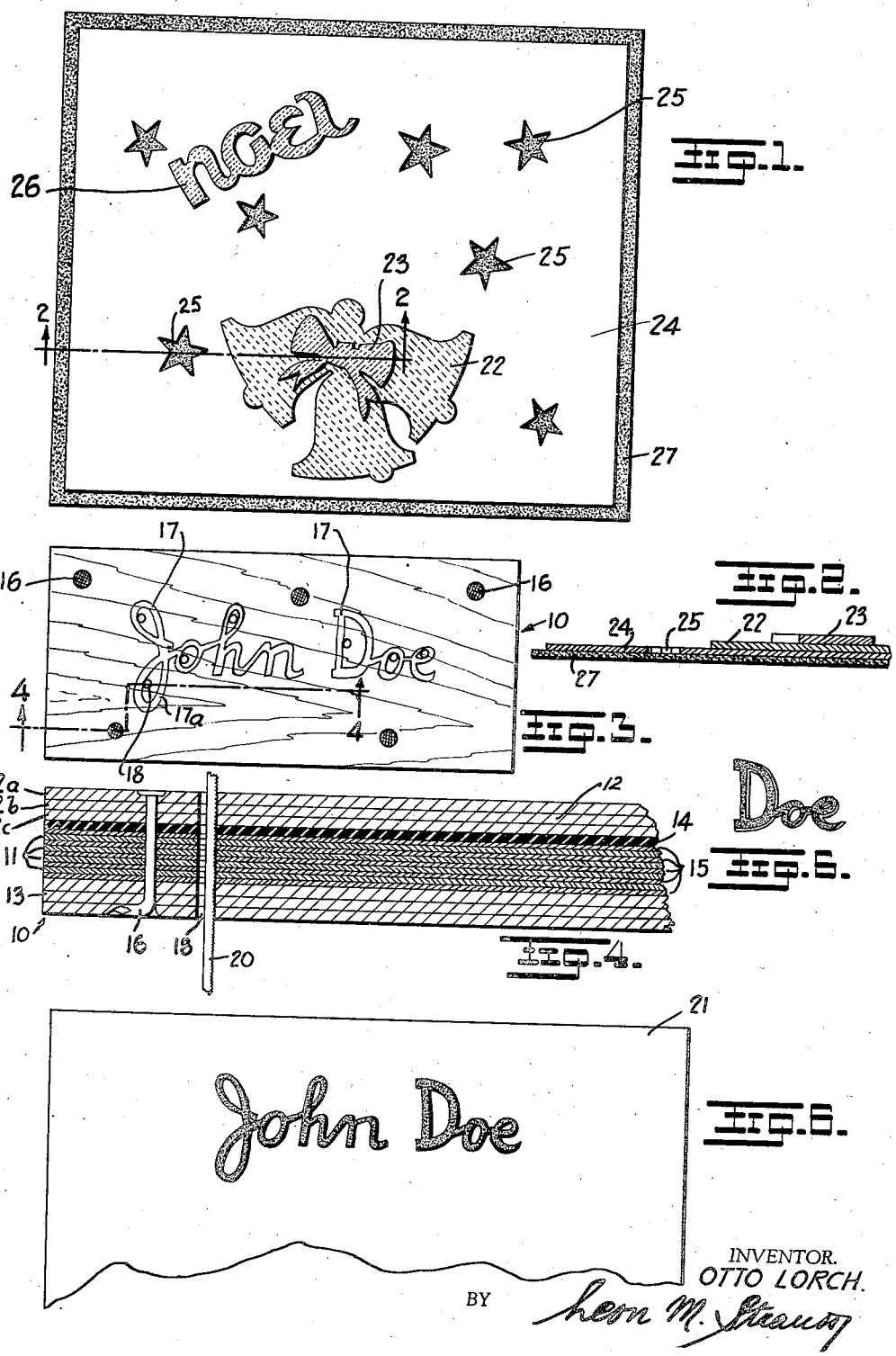
INVENTOR.
OTTO LORCH.

Patented Oct. 28, 1941

2,260,573

UNITED STATES PATENT OFFICE 2,260,573

PROCESS FOR THE PRODUCTION OF INDICIA AND LIKE DESIGNS

Otto Lorch, New York, N. Y.

Application September 9, 1939, Serial No. 294,195

5 Claims. (Cl. 164—17)

This invention relates to a process and means for the manufacture of indicia and decorative articles from plastic materials.

It is an object of the present invention to provide a process for producing accurate reproductions of various subjects matter, such as, for example, signatures, lettering, figures, indicia, designs, etc. It has further application to the production of such devices as monograms, display signs, price tickets, letters and numerals, signatures, etc. reproduced from original sketches, drawings, handwriting and the like.

It is a further object of the present invention to produce as articles of manufacture devices made in accordance with the said process.

It is still a further object of the present invention to provide method and means of mounting such subjects matter on any desired backing and, if desired, in superposed relation.

Still another object of the present invention resides in the provision of a method for simultaneously producing in finished form a plurality of identical indicia, designs or the like, which plurality may include various color combinations and may be of various thicknesses.

The invention in its general aspect, comprises for the manufacture of the product a laminated block generally consisting of a stack of sheets of cellulose acetate material placed between layers of protective material, the said protective layers providing means for maintaining said stack as a block in rigid condition, and further of shock absorber means for taking up vibrations during the cutting operation through said stack. The design or pattern to be reproduced is mounted on the top of the stack and the reproduction performed through the instrumentality of a hand or power operated saw provided with a saw blade of extremely fine teeth, thereby permitting the contour cutting of fine lines of indicia without causing any breakage of the material being cut, distortion or roughness of the finished product, such as an indicia. After the cutting operation the said block is disassembled, and the protective layers separated from said acetate layers.

The indicia resulting from the cut layers of plastic material after being cleaned are then subjected to further processing such as easeling, mounting and design forming.

These and other objects and advantages of the invention will appear from the following disclosure thereof together with the attached drawing which illustrates certain forms of embodiments thereof. These forms are shown for the purpose of illustrating the invention since the same has been found in practice to give satisfactory and reliable results, although it is to be understood that the various parts of which the invention consists, can be variously arranged and organized and that the invention is not limited to the precise arrangement and organization of the instrumetalities as herein shown and described.

Fig. 1 shows a plan view of a decorative article of manufacture made in accordance with the invention;

Fig. 2 is a sectional view taken along line 2—2 of Fig. 1;

Fig. 3 is a plan view of a block or stack employed in carrying out the invention;

Fig. 4 is a detail sectional view on an enlarged scale and taken along line 4—4 of Fig. 3;

Fig. 5 is an article produced by the process of the invention;

Fig. 6 shows the mounting of an article produced by the invention and applied to a backing, the latter being shown broken away.

Referring now to the drawing, and particularly to Fig. 4, there is disclosed a block 10 consisting of a plurality of layers of which numeral 11 designates layers of cellulosic, such as acetate material, 12 the top layer preferably made of plywood (3 plies 12a, 12b, 12c being shown), 13 the bottom layer of plywood and 14 shock absorber plate means preferably made of soft rubber or other resilient material. Between the respective layers 11, which may be in different colors and of different thicknesses, there are provided protective layers 15 of shock absorbing material, preferably of thin oil paper, so that there are presented alternate layers of acetate material 11 and of oil paper 15. All of the layers are rigidly connected together presenting a solid block of undisplaceable layers by any suitable means, such as nails 16; it being understood that any other suitable means may be employed for this purpose, such as clamps etc.

The indicia, character or design 17 to be reproduced is adhesively or otherwise secured to the top surface of the plywood layer 12 or the same may be imprinted or impressed directly on said layer 12.

In such letters, characters or designs, for instance "J" 17a, where loops are included in the letter formation, a hole 18 is drilled in said loop through which the fine toothed saw blade 20 is projected for the cutting operation. The cutting is then achieved in a well known manner by following the inner and outer contours of the character 17. After completion of the cutting operation the plastic layers 11 are withdrawn from block 10 and separated for further processing as, for instance, mounting on the plate or sheet 21.

With various cut-out sections thus obtained variegated embellishments may be created.

Fig. 5 shows a layer of lettering "Doe" separated from the remaining layers after the cutting operation. Lettering "Doe" may then be mounted by means of a suitable adhesive to a backing 21 forming part of a box or of a sheet of paper. In the latter case a new article of manufacture is provided having incorporated therein a raised, flexible and bendable letter head.

Fig. 1 illustrates by way of example a new decorative Christmas card, on which the wording 26 "noel" is mounted after being previously produced according to the above described method. In the same manner designs 22 and 23 are manufactured and then joined to backing 24 in superposed position (Fig. 2). Backing 24 may be perforated or otherwise provided with cut-outs as, at 25, to permit underlying parts of plate 27 to be exposed and seen through said perforations 25. It is understood, that since plate 27, backing 24 and all the other parts (26, 22, 23) may be made of relatively thin plastic or acetate material, the said parts may be arranged in any desired manner and united to each other as by suitable cement or adhesive to yield a new, light, flexible and attractive product having a more personal note or taste if a reproduced signature is added thereto as above mentioned.

It is preferred that the cement employed be one containing varying amounts of acetone, depending, of course, on the type of backgrounds or base (paper, cloth, wood, cellulose, acetate, metal plastics, glass, etc.) is used. The cement may be applied by brush or roller on the back of the indicia material to be mounted, the said material is then pressed on the base, the cement providing a flexible intimate bond having the property of binding the material, such as cellulose acetate indicia material permanently to its base or background.

The material from which the indicia or other reproductions above mentioned are made, is a plastic or cellulosic, preferably a cellulose acetate sheet material which may be clear, transparent, translucent, fluorescent or opaque of any desired gloss or dullness or color. The thickness of the sheet material from which the indicia or similar reproductions are made is preferably of an order of $5/1000$ to $\frac{1}{16}$ of an inch, thus making it possible to produce according to the aforesaid method indicia of varying thicknesses of material.

From the foregoing description, taken in connection with the accompanying drawing, the advantages of the process and article derived therefrom will be readily understood by those skilled in the art to which the invention pertains; and while I have described a principal process together with the product obtained therefrom which I may consider to be the best embodiment thereof, I desire to have it understood that the process described and the article shown is merely illustrative and that such changes may be made as are within the scope of the appended claims.

Having thus described the invention, what is claimed as new and desired to be secured by Letters Patent, is:

1. A process for the production of indicia or the like which consists in alternately placing sheets of plastic material and layers of shock absorbing material to form a block, maintaining said block in rigid condition, then disposing a pattern incorporating said indicia on said block, cutting through said block, and following the contour of said pattern.

2. A process for the production of indicia or the like which consists in alternately placing sheets of plastic material and layers of oil paper to form a block, maintaining said block in undisplaceable rigid condition, then disposing a pattern incorporating said indicia on said block, cutting by means of a saw blade said block, and following the contour of said pattern, with said saw blade.

3. A process for the production of indicia or the like which consists in alternately stacking sheets of plastic material and layers of oil paper to form a block, positioning on top of said block a soft rubber plate, maintaining said block with said plate in undisplaceable rigid condition, then disposing a pattern incorporating said indicia on said block, sawing through said block and said plate, and following the contour of said pattern.

4. A process for the production of indicia and like designs which consists in stacking sheets of plastic material to form a block, positioning on top of said block a soft rubber layer, engaging said block with said rubber layer by upper and lower clamping plates for maintaining said block with said rubber layer in undisplaceable condition, then arranging a pattern incorporating said indicia on the upper plate, sawing through said stacked sheets, said rubber layer and said plates and following the contour of said pattern.

5. A process for the production of indicia and like designs which consists in alternately placing sheets of acetate material and layers of oil paper to form a block, positioning on top of said block a soft rubber layer, engaging said block with said rubber layer by upper and lower clamping plates for maintaining said block with said rubber layer in undisplaceable condition, then arranging a pattern incorporating said indicia on the upper plate, sawing through said block, said rubber layer and said plates, and following the contour of said pattern.

OTTO LORCH.